United States Patent
Egan et al.

(10) Patent No.: US 7,032,127 B1
(45) Date of Patent: Apr. 18, 2006

(54) METHOD AND APPARATUS FOR IDENTIFYING DEFECTIVE AREAS ON A DISK SURFACE OF A DISK DRIVE BASED ON DEFECT DENSITY

(75) Inventors: Curtis W. Egan, Thornton, CO (US); Steve McCarthy, Mead, CO (US)

(73) Assignee: Maxtor Corporation, Longmont, CO (US)

( * ) Notice: Subject to any disclaimer, the term of this patent is extended or adjusted under 35 U.S.C. 154(b) by 683 days.

(21) Appl. No.: 09/848,109

(22) Filed: May 2, 2001

Related U.S. Application Data (60) Provisional application No. 60/203,085, filed on May 9, 2000.

(51) Int. Cl.
 *G06F 11/00* (2006.01)
(52) U.S. Cl. ............... 714/8; 360/53; 714/706
(58) Field of Classification Search .............. 714/8, 714/42, 704, 706; 360/53; 369/53.17; 324/212
See application file for complete search history.

(56) References Cited

U.S. PATENT DOCUMENTS

| | | | | |
|---|---|---|---|---|
| 3,771,143 | A * | 11/1973 | Taylor | 360/25 |
| 5,793,548 | A | 8/1998 | Zook | 360/51 |
| 5,835,930 | A * | 11/1998 | Dobbek | 711/4 |
| 6,100,683 | A | 8/2000 | Lim et al. | 324/212 |
| 6,104,188 | A * | 8/2000 | Coker et al. | 324/212 |
| 6,151,180 | A * | 11/2000 | Bang | 360/53 |
| 6,208,476 | B1 | 3/2001 | Park | 360/53 |
| 6,252,731 | B1 | 6/2001 | Sloan et al. | 360/31 |
| 6,281,676 | B1 * | 8/2001 | Ottesen et al. | 324/212 |
| 6,381,203 | B1 | 4/2002 | Muramatsu | 369/47.17 |
| 6,490,691 | B1 * | 12/2002 | Kimura et al. | 714/8 |
| 6,501,607 | B1 | 12/2002 | Keirn et al. | 360/31 |
| 6,513,141 | B1 | 1/2003 | Livingston | 714/792 |
| 6,580,768 | B1 | 6/2003 | Jaquette | 375/341 |
| 6,606,211 | B1 * | 8/2003 | Lim et al. | 360/53 |
| 6,646,822 | B1 | 11/2003 | Tuttle et al. | 360/46 |
| 2001/0010085 | A1 * | 7/2001 | Rafanello et al. | 714/710 |
| 2004/0205426 | A1 * | 10/2004 | Muranaka et al. | 714/704 |

OTHER PUBLICATIONS

Egan, U.S. Appl. No. 09/848,089 filed May 2, 2001, "Method and Apparatus for Flaw Detection in Synchronous Sampling (PRML) Read Channels Using Post Processed Digital Filter".

"Online Data Mining for Co-Evolving Time Sequences"; *School of Computer Science, Carnegie Mellon University, Pittsburgh, PA 15213;* reports-archive.adm.cs.cmu.edu/anon/1999/CMU-CS-99-171.ps. (26 pages).

* cited by examiner

*Primary Examiner*—Robert Beausoliel
*Assistant Examiner*—Marc M. Duncan
(74) *Attorney, Agent, or Firm*—Tejpal S. Hansra

(57) ABSTRACT

A method and apparatus for detecting flaws requiring sparing of portions of storage media included as part of a hard disk drive are provided. A window of a selected portion of the storage medium is formed, and the density of defects detected within that window is calculated. If the density of defects exceeds a threshold amount, a signal is passed to the controller. The portion of the storage media containing the defects that caused the generation of the flag may then be spared. The present invention allows the potential for detected defects to significantly affect the ability of the storage medium to be assessed. Furthermore, the present invention does not require that the location of each defect be stored in memory. Accordingly, the present invention is economical to implement, and allows defects to be assessed in substantially real time and with improved accuracy.

53 Claims, 8 Drawing Sheets

METHOD AND APPARATUS FOR IDENTIFYING DEFECTIVE AREAS ON A DISK SURFACE OF A DISK DRIVE BASED ON DEFECT DENSITY

CROSS REFERENCE TO RELATED APPLICATIONS

Priority is claimed from U.S. Provisional Patent Application Ser. No. 60/203,085, filed May 9, 2000 entitled "DETECTION OF MULTIPLE SMALL DEFECTS IN A FLAW DETECTION SYSTEM", the disclosure of which is incorporated herein by reference in its entirety.

FIELD OF THE INVENTION

The present invention relates to the detection of flaws in storage media that might prevent the reliable storage of data. In particular, the present invention relates to the detection of flaws that may prevent the reliable storage of data by assessing the density of detected defects in the storage media.

BACKGROUND OF THE INVENTION

Computer disk drives store information on magnetic disks. Typically, the information is stored on each disk in concentric tracks that are divided into servo sectors and data sectors. Information is written to or read from a disk by a transducer head, mounted on an actuator arm, capable of moving the transducer head radially over the disk. Accordingly, the movement of the actuator arm allows the transducer head to access different tracks. A disk is rotated by a spindle motor at a high speed, allowing the transducer head to access different sectors within each track on the disk. The transducer head may include integrated read and write heads.

In a typical computer disk drive, error correction code (ECC) is commonly used to assist in the reliable retrieval of stored data. In general, error correction code allows data that may have otherwise been lost to be reconstructed. However, serious defects in the media used to store the data can overwhelm the ability of the error correction code to rebuild lost data upon retrieval. Furthermore, error correction code requires that data be stored on the disk that is in addition to the user data. Therefore, error correction code occupies storage space that could otherwise be used to store user data. Furthermore, as the ability of an error correction code scheme to retrieve lost data is increased, the storage space required to store the additional information required by the error correction code generally increases. For all these reasons, the ability of error correction code to rebuild lost data is typically limited.

In order to help prevent delivery of computer disk drives having defects in storage media to end users, disk drives are typically tested for such defects. According to a typical testing procedure, data is written to the storage media in a test pattern. The test pattern is then read from the storage media and the results of the read operation are compared to the expected results. For example, a signal produced in the channel of a hard disk drive as a result of reading the test pattern may be periodically sampled, and the amplitudes of the samples may be compared to the expected amplitudes. A signal indicating the detection of a defect may be generated if a sampled value is less than the corresponding expected value. For further information regarding a method and apparatus used to detect flaws in storage media, see U.S. patent application Ser. No. 09/848,089 filed May 2, 2001, entitled "METHOD AND APPARATUS FOR FLAW DETECTION IN SYNCHRONOUS SAMPLING (PRML) READ CHANNELS USING POST PROCESSED DIGITAL FILTERS" to Curtis Egan, and assigned to the assignee of the present invention, the entire disclosure of which is hereby incorporated by reference.

In response to receiving an indication that an area of the storage medium contains a defect, the controller of the hard disk drive may spare, or mark as unsuitable for storing data, the affected area. For example, the data sector containing the defect, or all of the data sectors in the area between the hard sectors in which the defect is located, may be spared. However, the sparing of portions of the storage media diminishes the storage capacity of the hard disk drive. Therefore, it is desirable to avoid unnecessarily sparing portions of the storage media. In addition, it often is unnecessary to spare a portion of the storage media in response to the detection of an isolated defect. This is because the error correction code is often sufficient to allow for the reliable storage and retrieval of data in areas of the storage media that contain relatively few defects. Therefore, such areas need not be spared in order to provide a disk drive capable of reliably storing and retrieving data.

In addition, it is desirable to locate defects on storage media within a reasonably small area of the media, so that the spared areas may be as small as possible. However, conventional systems that allow information regarding the location of defects to be stored have typically required that the specific address at which the defect was detected be stored, at least temporarily. Such methods therefore require that additional memory be provided that is capable of storing such information for later analysis. In addition, the analysis of defect location data to determine its location on the disk in proximity to other defects requires processing power and time, as well as implementing software or firmware, and cannot be performed in substantially real time.

For the above stated reasons, it would be desirable to provide an improved method and an apparatus for determining whether flaws detected in storage media require sparing. In addition, it would be advantageous to provide such a method and apparatus that was capable of determining the density of defects per unit area of the storage media, without requiring specific defect location information to be stored. Furthermore, it would be advantageous to provide a method and an apparatus for assessing whether an area of storage media should be spared that could be implemented as part of the firmware of a computer disk drive, or of software controlling the operation of a computer disk drive. Furthermore, it would be advantageous to provide such a method and apparatus that are reliable in operation and that are relatively inexpensive to implement.

SUMMARY OF THE INVENTION

In accordance with the present invention, a method and an apparatus for detecting multiple small defects in a flaw scan detection system are provided. The present invention generally allows the density of flaws detected in a storage medium to be determined. If the density of the detected defects exceeds a threshold amount, the area containing those defects may be spared. Accordingly, the present invention allows a determination as to whether areas of a storage medium should be spared based on a criterium that is indicative of the ability of the disk drive to reliably store and retrieve information in that area of the storage medium.

According to one embodiment of the present invention, a method is provided for determining the density of defects occurring on a storage medium. In general, a window encompassing a selected portion of the storage medium, such as a portion of track sufficient to store a selected number of bytes of information, is defined. According to one embodiment, the size of the window is not static, but varies. The length of track within the window is then scanned for flaws. The window may be defined in terms of a number of bytes of storage space. A signal is generated by a flaw detection circuit or by software or firmware operating in connection with the disk drive, for each defective unit of storage space within the window. For example, a signal may be generated for each defective byte of storage space within the window. If a selected number of defects are present in the window at any one time (i.e., the density exceeds a selected amount), a flag is generated. In response to the flag, the controller may spare the portion of the track containing the overly dense concentration of defects.

According to another embodiment of the present invention, a method is provided for assessing the density of defects in a storage medium in which a counter is incremented by a predetermined amount for each defect encountered in a byte of storage space. Whether or not a byte of storage space contains a defect, the counter is decremented a selected amount as each byte of storage space is scanned. If the value held by the counter exceeds a threshold amount, a signal is generated and that signal is provided to the controller. The controller may then spare the portion of track in which the defects that caused the signal to be generated are located.

According to still another embodiment of the present invention, an apparatus is provided for determining the density of defects in a storage medium. According to the apparatus, a counter is incremented by a predetermined amount as defects in a track on the storage medium are detected. The detection of a defect may pertain to a length of track required to store one byte of information. A byte clock provides a signal corresponding to the time required for the transducer head to pass over a length of track equal to the length required to store one byte of information. For each pulse of the byte clock, the value held by the counter is decremented by a selected amount. A comparator is provided at a first input with the value held by the counter, and at a second input with a threshold value held in a memory. If the counter value is greater than or equal to the threshold value, a flag is generated.

According to still another embodiment of the present invention, the rate at which the value held by the counter is decremented may be varied. For example, in response to an isolated defect, the value held by the counter may be decremented at a relatively slow rate. However, in response to a number of defects in close proximity to one another, the rate at which the value held by the counter is decremented may be increased. Varying the rate of decay of the value held by the counter generally allows the area of the storage medium (i.e. the window) under consideration to be maintained within a specified maximum size. Doing so helps to avoid unnecessarily sparing large areas of the storage medium by maintaining an appropriately sized window.

According to yet another embodiment of the present invention, the maximum count value held by the counter may be limited to a predetermined amount. According to a further embodiment of the present invention, the amount by which the counter is incremented may be varied.

Additional advantages of the present invention will become readily apparent from the following discussion, particularly when taken together with the accompanying drawings.

DETAILED DESCRIPTION

Figure 1:
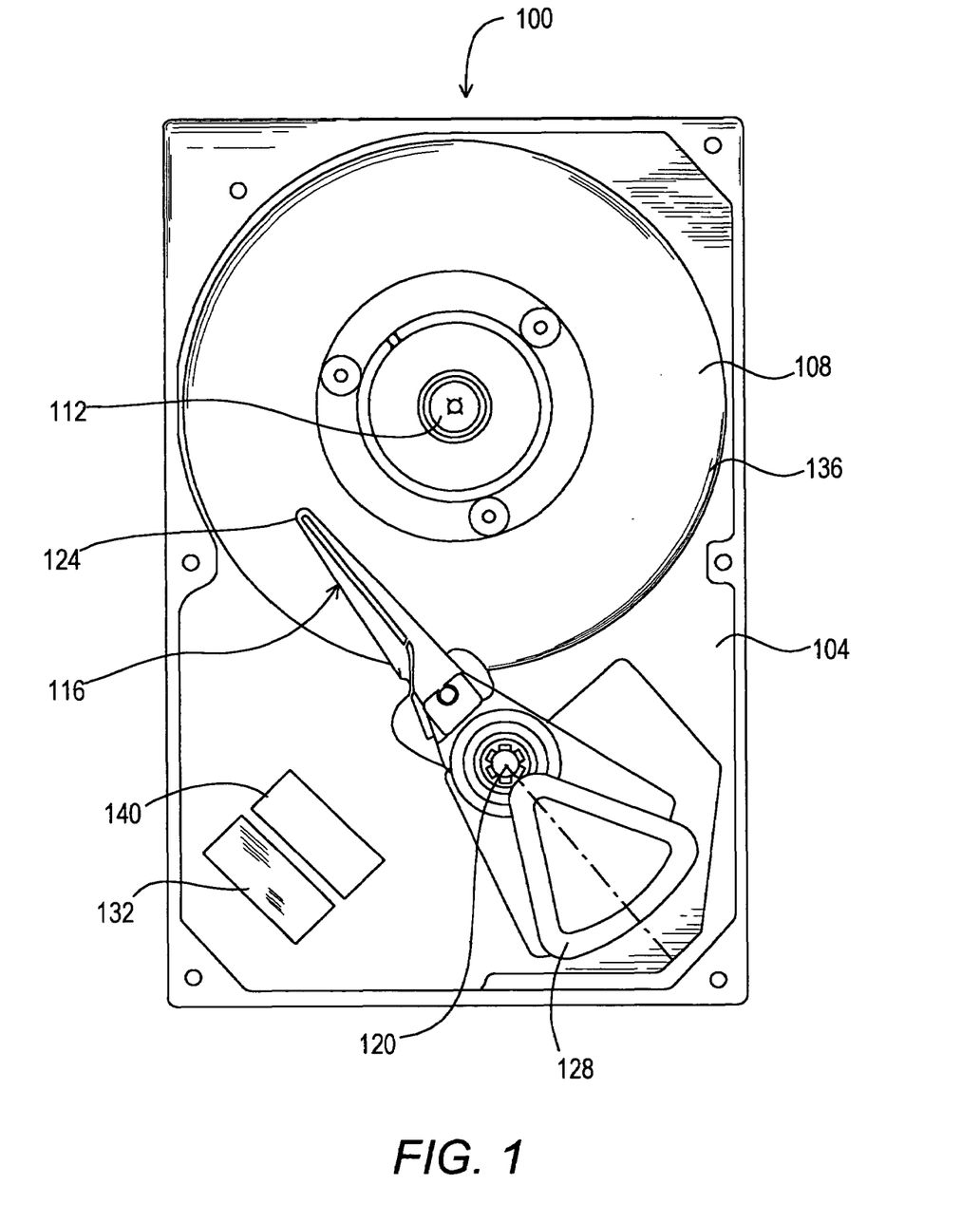
FIG. 1 is a diagrammatic representation of a top view of a conventional computer disk drive, with the cover removed.

FIG. 1 illustrates a typical computer disk drive 100. The disk drive 100 generally includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor 128 pivots the actuator arm assemblies 116 about the bearing 120 to radially position the transducer heads 124 with respect to the magnetic disks 108. The voice coil motor 128 is operated by a controller 132 that is in turn operatively connected to a host computer (not shown). By changing the radial position of the transducer heads 124 with respect to the magnetic disks 108, the transducer heads 124 can access different data tracks or cylinders 136 on the magnetic disks 108. The disk drive 100 also generally includes a channel 140 for receiving and decoding data read from the disks 108 by the transducer heads 124.

Figure 2:
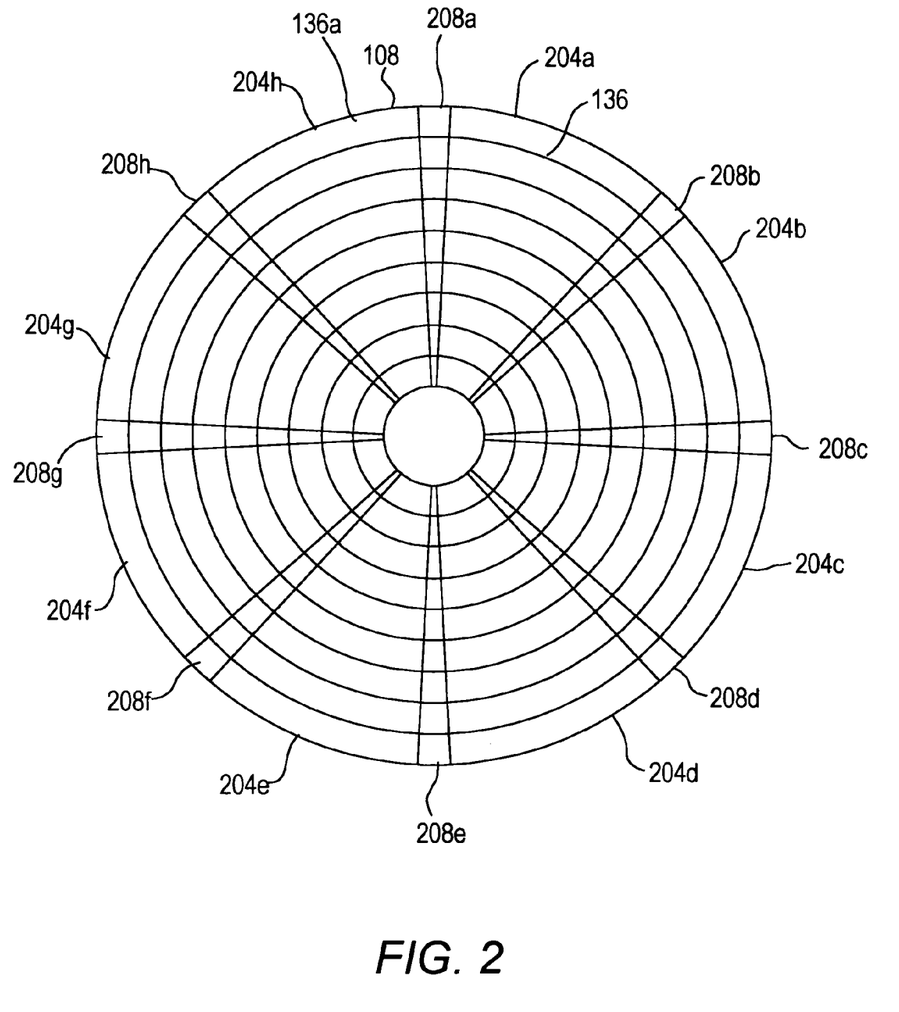
FIG. 2 is a diagrammatic representation of a magnetic storage disk.

With reference now to FIG. 2, a typical arrangement of data tracks 136 on a magnetic disk 108 is illustrated. Usually, the data tracks 136 are divided into data fields 204a–204h with a servo sector 208a–208h between one or more of the data fields 204. Generally, the data fields 204a–204h are used for storing data as a series of magnetic transitions, while the servo sectors 208a–208h are used for storing information used to provide the transducer head 124 with positioning information, also as a series of magnetic transitions.

Although the magnetic disk 108 shown in FIGS. 1 and 2 is illustrated as having a relatively small number of tracks and sectors, it can be appreciated that a typical computer disk drive contains a very large number of such tracks and sectors. For example, computer disk drives having over 30,000 tracks per inch and 120 servo sectors in a track are presently available. In addition, alternate configurations of magnetic disks 108 are possible. For example, in a computer disk drive having several magnetic disks 108, a surface of one of the disks 108 may be dedicated to servo information, while the surfaces of the remaining disk 108 may be used exclusively to store data.

In order to reliably store and retrieve user data, the disk 108 must be relatively defect-free. In particular, defects that might cause data loss errors are preferably detected after assembly of the disk drive 100, but before the drive 100 is delivered to an end user. Areas of a disk 108 containing significant defects, for example, defects that might overwhelm any provided error correction features of the disk drive 100, are preferably identified and spared, so that no user data is stored to those sections. An area of a disk 108, or in particular a length of track 136, containing a high density of defects is more likely to experience errors in storing and retrieving data that overwhelm the error correction capabilities of the disk drive 100, than is a length of track 136 having defects that are distributed such that their density is low. As used herein, defect density shall be understood to refer to the number of detected defects within a predetermined length of track 136.

Figure 3:
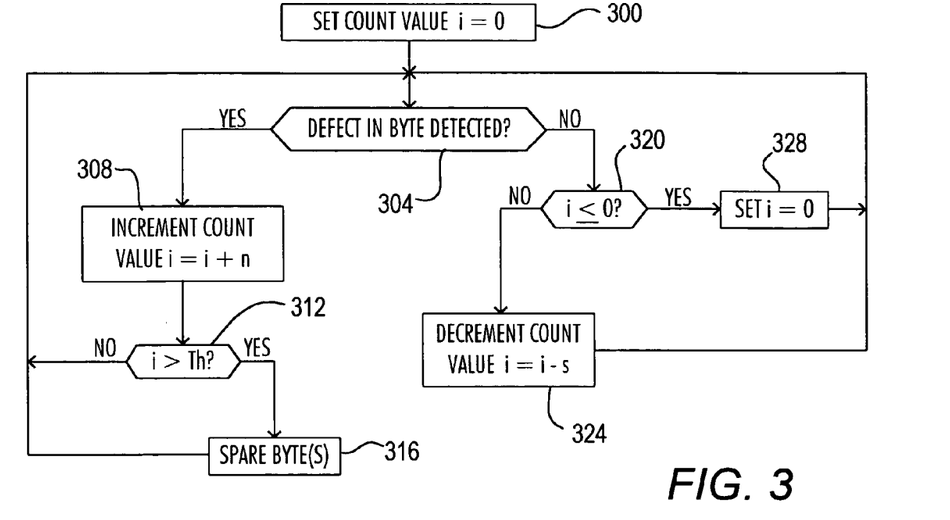
FIG. 3 is a flow chart illustrating operational aspects of an embodiment of the present invention.

With reference now to FIG. 3, operational aspects of an embodiment of the present invention are illustrated. Initially, the count value i is set to 0 (step 300). The value i represents a number of defects per unit area of the disk 108, or the defect density. Next, a determination is made as to whether a defect in a byte of storage space in a track 136 has been detected (step 304). If a defect has been detected, the count value i is incremented by a value n (i=i+n) (step 308). Next, a determination is made as to whether the count value i is unacceptable. For example, a determination is made as to whether i is greater than a threshold value (Th) (step 312). If i is greater than the threshold (i.e. is unacceptable), a selected portion of the storage space on the track 136 is spared (step 316). That is, the byte under consideration is marked as bad, and therefore the disk drive 100 will not attempt to store information in that portion of the track 136. Alternatively, a greater portion of the track 136 may be spared. For example, the bytes on either side of the byte found to contain a defect requiring sparing may also be spared, so that a total of three bytes are removed as storage areas on the disk 108. This sparing of additional bytes may be desirable to ensure that any data written to the disk 108 may be reliably retrieved. For instance, the disk drive 100 may have error correction features capable of reliably storing data even if defects in a track 136 are detected up to a certain density of defects. However, if the count value i indicates a high density of defects, the error correction features may be unable to fully compensate. Therefore, to allow for a margin of safety, additional bytes may be spared. After the byte or bytes have been spared, the system returns to step 304 to determine whether the next byte of storage space under analysis contains a defect.

If i is not greater than the threshold value (step 312), the system returns to step 304, without sparing any portions of the disk 108, to determine whether a defect exists in the next byte of storage space under examination.

If the byte of storage space under examination is not found to contain a defect (step 304), the system determines whether the count value i is less than or equal to 0 (step 320). If i is not less than or equal to 0, the count value i is decremented by a value s (i=i−s) (step 324). The value s represents a rate of decay. After the count value i has been decremented, the system returns to step 304 to make a determination as to whether the next byte of storage space under examination contains a defect. If i is less than or equal to 0, i is set equal to zero (step 328) and the system returns to step 304.

From the foregoing description, it is apparent that the count value i is incremented for each byte containing a defect, and decremented for each byte having no defects. In addition, it will be appreciated that the count value cannot be less than 0. Furthermore, defects detected in bytes of storage space in close proximity to one another (i.e. a high defect density) make it more likely that the count value i will exceed the threshold value Th.

In general, the values n, s and Th are selected so that portions of a track 136 are spared if the defect density in a selected portion or window of the track 136 exceeds a predetermined amount. The predetermined amount is based upon the ability of the error correction facilities to tolerate defects. In the above example, n represents the amount by which the count value is incremented when a defect is detected, s is the amount by which the count value may be decremented for each unit of storage space in which a defect is not detected, and Th is the amount that must be exceeded if a portion of the track 136 is to be spared. It can be appreciated that the values for n, s and Th must balance so that portions of a track 136 are spared only if the density of defects exceeds the predetermined amount. Also, it usually is desirable to provide a margin of safety between the detected defect density and the defect density at which data can be reliably stored. According to one embodiment of the present invention, Th=(D−1) n, where D is a selected number of defects, and n=s·w where w is the number of bytes in the window. In one application, D is equal to 4, n is equal to 5, s is equal to 1, and Th is equal to 15.

Figure 4A:
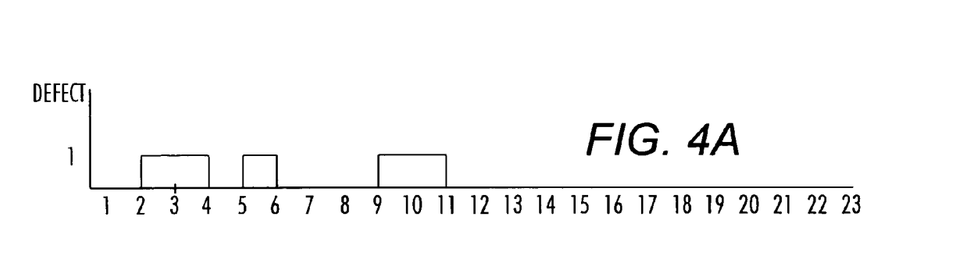
FIG. 4A depicts a defect signal.
Figure 4B:
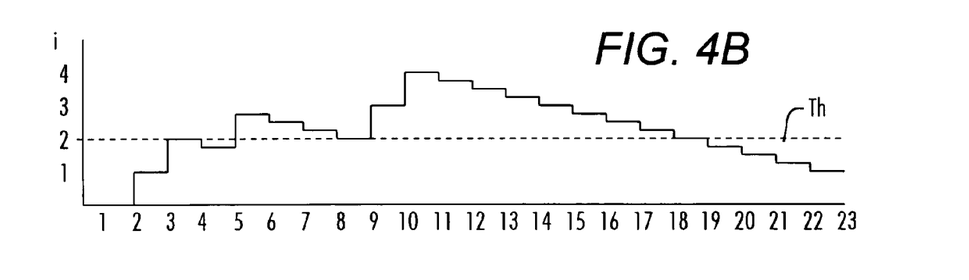
FIG. 4B depicts a counter value of an embodiment of the present invention in response to the defect signal of FIG. 4A.
Figure 4C:
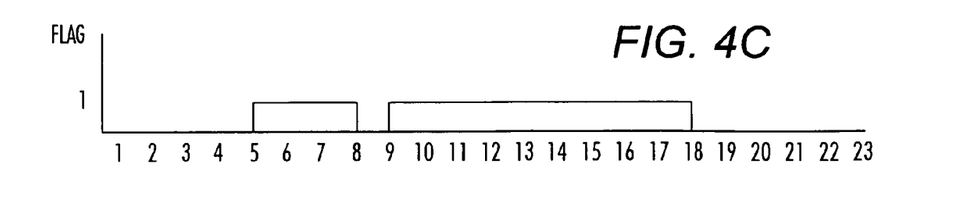
FIG. 4C depicts a defect flag signal produced by one embodiment of the present invention in response to the counter value of FIG. 4B.

With reference now to FIGS. 4A, 4B and 4C, the operation of the system described in connection with FIG. 3 is described in the context of an example. For this example, it will be assumed that n is equal to 1, s is equal to ¼, and Th is equal to 2 where n is the amount by which the count value i is incremented when a defect is detected, s is the rate of decay per byte of storage space in a track 136 when a defect is not detected, and Th is the threshold that must be exceeded before portions of the track 136 are spared. FIG. 4A depicts a defect signal, such as may be provided by a flaw detection circuit or routine. FIG. 4B depicts a count value held in response to detected defects (i.e. in response to the defect signal). FIG. 4C depicts a defect flag signal generated when i is greater than Th.

As shown in FIG. 4A, initially no defect is found in byte 1. Because no defect is detected with respect to byte 1, the count value i (FIG. 4B), which was initialized at 0, remains at 0. In byte 2, a defect is detected. Therefore, the count value i is equal to 1. At byte 3, another defect is detected. Accordingly, count value i will now be equal to 2. However, a flag is not generated, because according to the present example, the threshold is 2, and the count value i must be greater than the threshold before a defect flag is generated. No defect is detected in byte 4. The rate of decay s in the present example is ¼. Therefore, the count value i is equal to $2-\frac{1}{4}=1\frac{3}{4}$. A defect is detected in byte 5. Accordingly, i will now be equal to $2\frac{3}{4}$. This is greater than the threshold 2, therefore a flag is generated. With reference now to FIG. 4C, the assertion of the defect flag signal can be seen beginning at byte 5. In response to the defect flag, the system may spare byte 5.

At byte 6, no defect is detected, and i therefore decays by $\frac{1}{4}$ so that it is now equal to $2\frac{1}{2}$. Because the count value i remains greater than the threshold value, a defect flag is again generated. At byte 7, again no defect is detected, and the count value i decays to $2\frac{1}{4}$. The count value i remains greater than the threshold 2, therefore a defect flag is again generated.

At byte 8, again no defect is detected, and count value i decays to a value of 2. Because 2 is not greater than the threshold, the defect flag is no longer generated.

At byte 9, a defect is detected, so that the count value i is now equal to 3. Because 3 is greater than the threshold value, a defect flag is generated. Another defect is detected at byte 10, causing the count value i to equal 4, and the defect flag continues to be generated.

Bytes 11–23 are not found to contain defects. Therefore, the count value i decays by $\frac{1}{4}$ for each of the bytes 11–23. A defect flag indicating a high defect density continues to be generated until byte 18, where the count value i becomes equal to 2.

From the foregoing example, it can be appreciated that the system becomes more conservative, that is it becomes more likely to generate a defect flag, after a series of defects in close proximity. This is because the value n is greater than s. This increased conservatism may be desirable, because it results in a detection system that is more likely to spare areas of a track 136 having a high defect density. A high defect density is more likely to overwhelm the error correction capabilities of the disk drive 100 than is a number of defects distributed such that the defect density is low. Therefore, the present invention allows areas of a disk 108 to be spared according to the likelihood that loss of data will occur.

Also from the foregoing example, it is apparent that the embodiment described in connection with FIGS. 3, 4A, 4B and 4C has a detection window that becomes effectively larger after a series of defects in close proximity. In other applications, it may be desirable to limit the extent to which the detection window grows after a series of defects. This may be accomplished by varying the rate of decay s, by varying the value n allocated to each defect, by limiting the maximum value of i, by varying the threshold value Th, or by various combinations of such measures.

Figure 5:
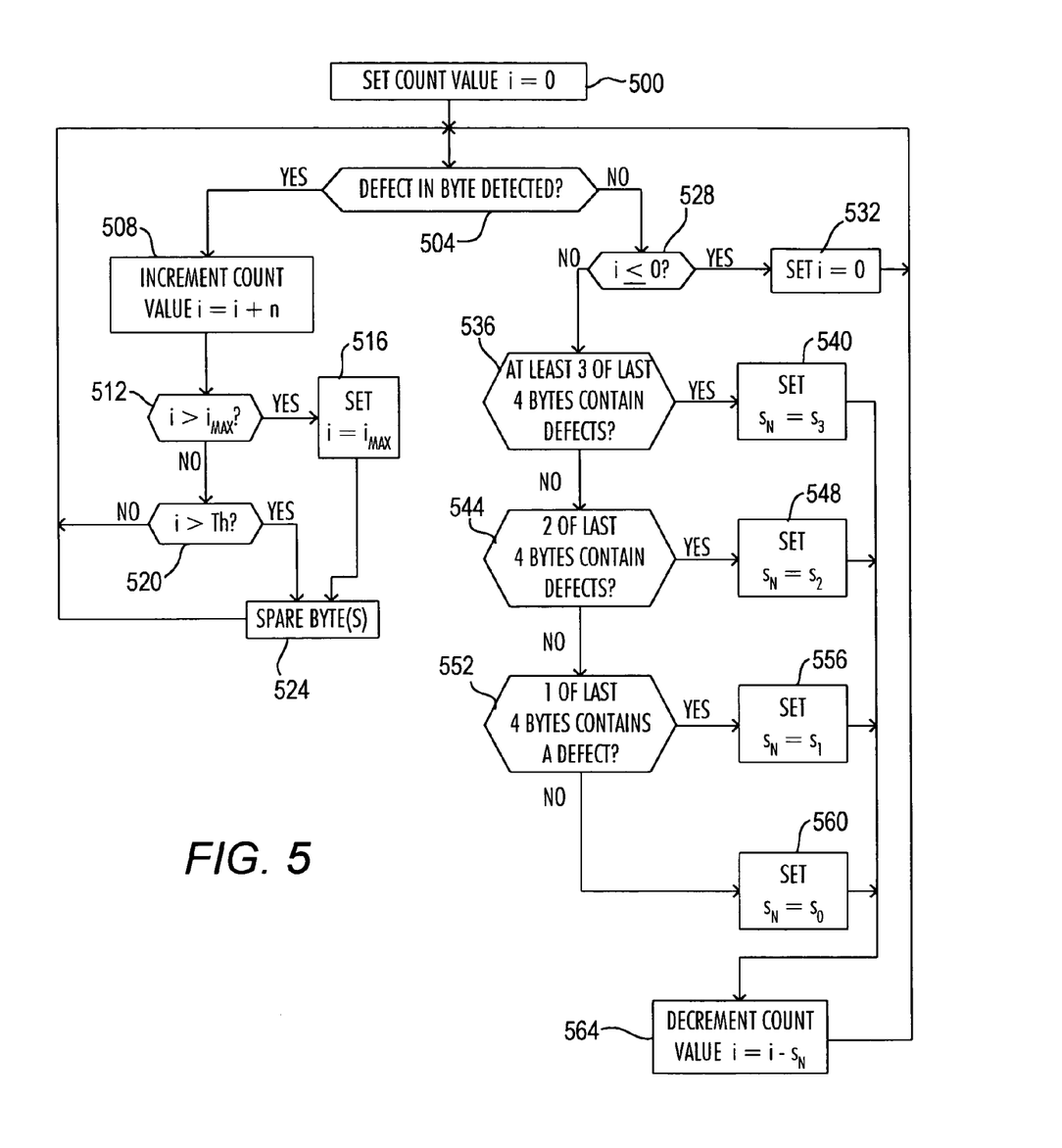
FIG. 5 is a flow chart illustrating operational aspects of another embodiment of the present invention.

With reference now to FIG. 5, operational aspects of another embodiment of the present invention are illustrated. In particular, the embodiment of the invention illustrated in FIG. 5 includes a maximum count value ($i_{max}$) and a variable rate of decay ($s_n$). Initially, the count value i is set to zero (step 500). Next, a determination is made as to whether a defect in a byte of storage space in a track 136 has been detected (step 504). If a defect has been detected, the count value i is incremented by a value n (i=i+n) (step 508). Next, a determination is made as to whether the count value i is greater than a maximum count value $i_{max}$ (step 512). If i is greater than $i_{max}$, the value of i is set equal to $i_{max}$ (step 516). If i is not greater than $i_{max}$, a determination is made as to whether the value of i is unacceptable. For example, a determination is made as to whether i is greater than a threshold value Th (step 520). If i is greater than the threshold value Th, a selected portion of the storage space on the track 136 is spared (step 524). That is, the byte with respect to which the defect causing the count value i to exceed the threshold or to continue to exceed the threshold is spared, or the byte under consideration and/or one or more bytes adjacent to the byte under consideration are spared. Similarly, if the count value i is greater than $i_{max}$, after setting i equal to $i_{max}$ (step 516) the system proceeds to spare a portion of the storage space on the track 136 at step 524. After the selected portions of the track 136 have been spared (step 524) the system returns to step 504 to determine whether the next byte of storage space under consideration contains a defect.

If the byte of storage space under consideration is not found to contain a defect (step 504), the system determines whether the count value i is less than or equal to zero (step 528). If i is less than or equal to zero, i is set equal to zero (step 532), and the system returns to step 504 to determine whether the next byte of storage space under consideration contains a defect.

If i is not less than or equal to zero (step 528) a determination is made as to whether at least three of the last 4 bytes contain defects (step 536). If the condition of step 536 is true, the rate of decay ($s_n$) is set equal to $s_3$ ($s_n=s_3$) (step 540). If the condition of step 536 is false, the system proceeds to step 544 in which a determination is made as to whether two of the last 4 bytes contain defects (step 544). If the condition of step 544 is true, $s_n$ is set equal to $s_2$ ($s_n=s_2$) (step 548). If the condition of step 544 is false, the system determines whether one of the last 4 bytes contains a defect (step 552). If the condition of step 552 is true, $s_n$ is set equal to $s_1$ ($s_n=s_1$) (step 556). If the condition of step 552 is false, the system sets $s_n$ equal to $s_0$ ($s_n=s_0$) (step 560).

After the value of $s_n$ has been selected, the count value i is decremented by $S_n$ (that is, $i=i-s_n$) (step 564). After the count value i has been decremented, the system returns to step 504 to make a determination as to whether the next byte of storage space under consideration contains a defect.

From the foregoing description, it is apparent that the count value i cannot exceed a selected maximum value $i_{max}$. Additionally, it can be appreciated that the rate of decay ($s_n$) is selected based upon the number of defects encountered within a selected number of preceding bytes. Accordingly, the rate of decay may be adjusted depending upon the frequency of recent defects. According to one embodiment of the present invention, $S_n$ is assigned a higher value, corresponding to a greater rate of decay, after a relatively large number of defects have been encountered, and a smaller value, corresponding to a smaller rate of decay, if relatively few defects recently have been encountered. That is, with reference again to FIG. 5, $s_3$ would have a greater value than $s_2$, which would have a greater value than $s_1$, which in turn would have a greater value than $s_0$.

In general, the selection of a maximum value for i allows the system to limit the maximum size of the window within which defect density is assessed. Providing a rate of decay that increases in response to a higher detected density of defects, also has the effect of limiting the size of the window in which defects are considered.

Figure 6A:
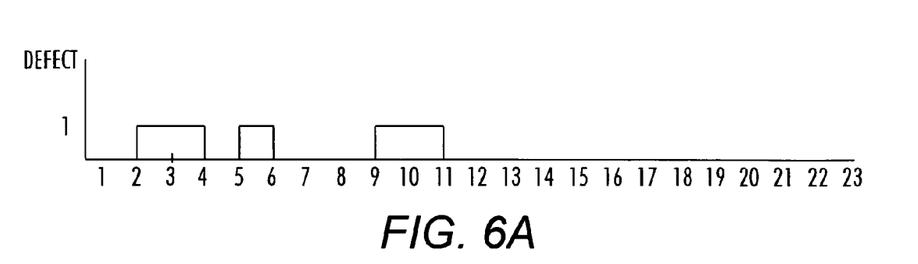
FIG. 6A depicts a defect signal.
Figure 6B:
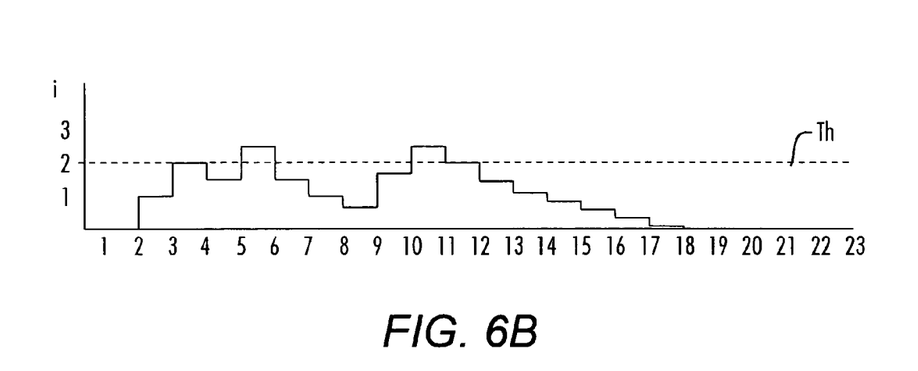
FIG. 6B depicts a counter value of another embodiment of the present invention in response to the defect signal of FIG. 6A.
Figure 6C:
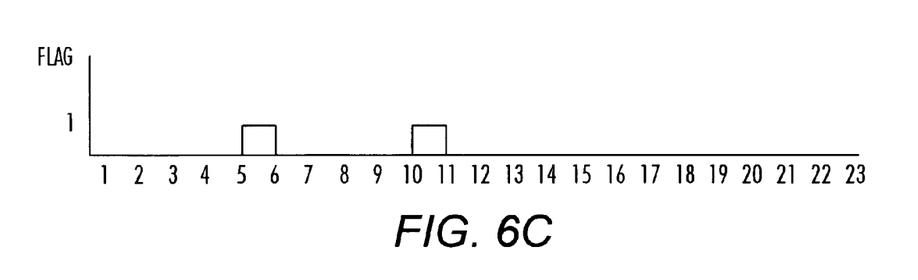
FIG. 6C depicts a defect flag signal produced by another embodiment of the present invention in response to the counter value of FIG. 6B.

With reference now to FIGS. 6A, 6B and 6C, the operation of the system described in connection with FIG. 5 is described in the context of an example. For this example, it will be assumed that n is equal to 1, $s_0$ is equal to 0.25, $s_1$ is equal to 0.33, $s_2$ is equal to 0.5, $s_3$ is equal to 1, Th is equal to 2, and $i_{max}$ is equal to 2.5. FIG. 6A depicts a defect signal, such as may be provided by a flaw detection circuit or routine. It will be noted that FIG. 6A depicts the same defect signal as the defect signal depicted in FIG. 4A above. FIG. 6B depicts the count value i held in response to detected defects. FIG. 6C depicts a defect flag signal generated when the count value i exceeds the threshold.

Initially, no defect is found in byte 1 (FIG. 6A). Accordingly, the count value i, which was initialized at zero, remains at zero (FIG. 6B). A defect is detected at byte 2. Therefore, the count value i is incremented by one. At byte 3, another defect is detected. Therefore, the count value i is now equal to 2. A flag is not generated with respect to byte 2, because count value i is not greater than the threshold to 2. No defect is detected in byte 4. Because two of the previous 4 bytes contain defects, the rate of decay $s_n$ is set equal to $s_2$. According to the present example, $s_2$ is equal to 0.5. Therefore, the count value i is decremented by 0.5, and is now equal to 1.5.

A defect is detected in byte 5, causing the count value i to be equal to 2.5. This is greater than the threshold value of 2, therefore a defect flag is generated (FIG. 6C). In response to the defect flag, the system may spare byte 5, bytes 4 and 5, or any selected set of bytes in the vicinity of and including byte 5.

At byte 6, no defect is detected. Because at least 3 of last 4 bytes contained defects, at the rate of decay $s_n$ is set equal to $s_3$, or 1 in the present example. Accordingly, the count value i is decremented by 1 so that it now equals 1.5. Because 1.5 is less than the threshold 2, the defect flag is discontinued. It will be noted that, with respect to the embodiment of the invention described with respect to FIG. 3 and FIG. 4, a defect flag was still generated with respect to bytes 6 and 7. However, because of the variable rate of decay provided by the embodiment illustrated in connection with FIG. 5, and because the rates of decay that may be selected are all greater than the example of FIG. 4, no defect flag is generated in connection with bytes 6 and 7.

With respect to byte 7, again no defect is detected. Because two of the last 4 bytes contain defects, $s_n$ is set equal to $s_2$, or 0.5 in the present example, and i is decremented to become equal to 1.0. At byte 8, no defect is detected. Because one of the last 4 bytes contained a defect, $s_n$ is set equal to $s_1$, or 0.33 in the present example, and i becomes equal to 0.67.

At byte 9, a defect is detected. Therefore, i is incremented by 1 to become equal to 1.67. At byte 10, another defect is detected causing i to be equal to 2.67. However, 2.67 is greater than $i_{max}$, which is 2.5 in the present example. Therefore, i is set equal to 2.5. At byte 11, no defect is detected. Because two of the last 4 bytes contain defects, $s_n$ is set equal to 0.5, the count value is decremented to 2.0, and the defect flag is no longer asserted. At byte 12, again no defect is detected, and again count value i is decremented by 0.5, because two of the previous 4 bytes were found to contain defects. At byte 13, no defect is detected, and i is decremented by 0.33, because one of the last 4 byes contained a defect, thereby leaving i equal to 1.17. At byte 14, again no defect is detected. Because none of the last 4 bytes contained a defect, the rate of decay is set to 0.25. The count value i continues to decay by 0.25 until byte 18, because no more defects are detected in the present example. At byte 18, the count value i, which is at this point equal to 0.17, is decremented by 0.25. The resulting value, minus 0.8, is less than zero. Therefore, i is set equal to zero.

A comparison of FIGS. 4B and 4C to FIGS. 6B and 6C illustrates the effects of constraining the count value i to a predetermined maximum ($i_{max}$) and of providing a variable decay. In particular, the selection of a maximum count value prevents the system from accumulating a very large value i, for instance in response to a large number of defects concentrated together. The accumulation of a very large value for i may result in a defect flag being generated even in connection with bytes that are not in close proximity to bytes containing a defect. That is, providing a maximum count value prevents the window in which defects are considered from becoming overly large. Accordingly, assigning a maximum count value i prevents portions of a track from being spared unnecessarily.

The provision of a variable decay rate $s_n$ allows this system to be responsive to detected defects. In particular, providing a relatively high rate of decay after a series of defects are detected allows the size of the window in which defects are considered to be more limited. That is, it allows the system to become less sensitive to defects after a certain number have been encountered, or after a certain density of defects has been observed.

The response of the system may also be adjusted by providing for a variable value for n. For example, n may be assigned a greater value when none or a few isolated defects are detected, and a lesser value after a series of defects. The response of the system may also be adjusted by providing a variable value for Th. For example, Th may be assigned a lesser value when none or a few isolated defects are detected, and a greater value after a series of defects.

Figure 7:
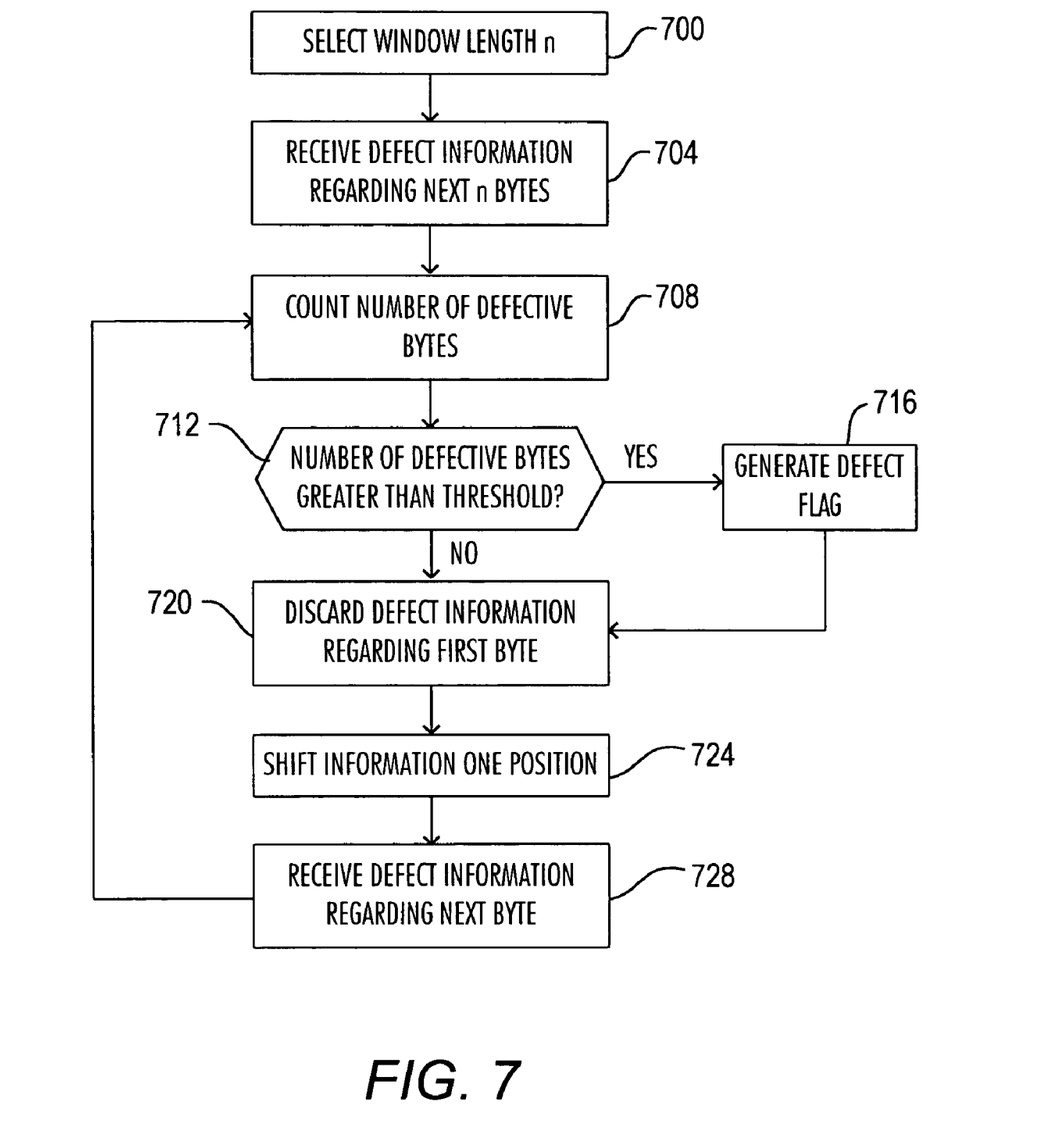
FIG. 7 is a flow chart illustrating operational aspects of yet another embodiment of the present invention.

With reference now to FIG. 7, the operation of yet another embodiment of the present invention is illustrated. Initially, at step 700, a window length n is selected. Next, defect information regarding the next n bytes is received (step 704). For instance, a shift register may be used to accumulate defect information regarding the previous n bytes.

At step 708, the number of defective bytes is counted. The number of defective bytes is then compared to a selected threshold. For example, the number of defective bytes is compared to the threshold to determine whether the threshold value has been exceeded (step 712). If the threshold value has been exceeded, a defect flag is generated (step 716). The system then proceeds to step 720, in which defect information regarding the first byte of the n bytes under consideration is discarded. At step 724, the information held by the shift register is shifted by one position. Then, defect information regarding a next byte is received (step 728). For example, the information regarding the next byte is placed in the last position of the shift register, which is now vacant following the steps of discarding the information regarding the first byte (step 720) and of shifting the information one position (step 724). If the number of defects is not greater then the threshold value, the system continues through steps 720, 724 and 728 without generating a defect flag. In any event, after defect information regarding a next byte is received (step 728), the system returns to step 708.

From the above description, it can be appreciated that the embodiment of the invention described in connection with FIG. 7 considers a selected window of bytes. Bytes are passed into and out of the window on a first in, first out basis. Accordingly, the window can be considered a dynamic window in that it moves one byte at a time along a track. In this way, defect densities are continually assessed.

Figure 8:
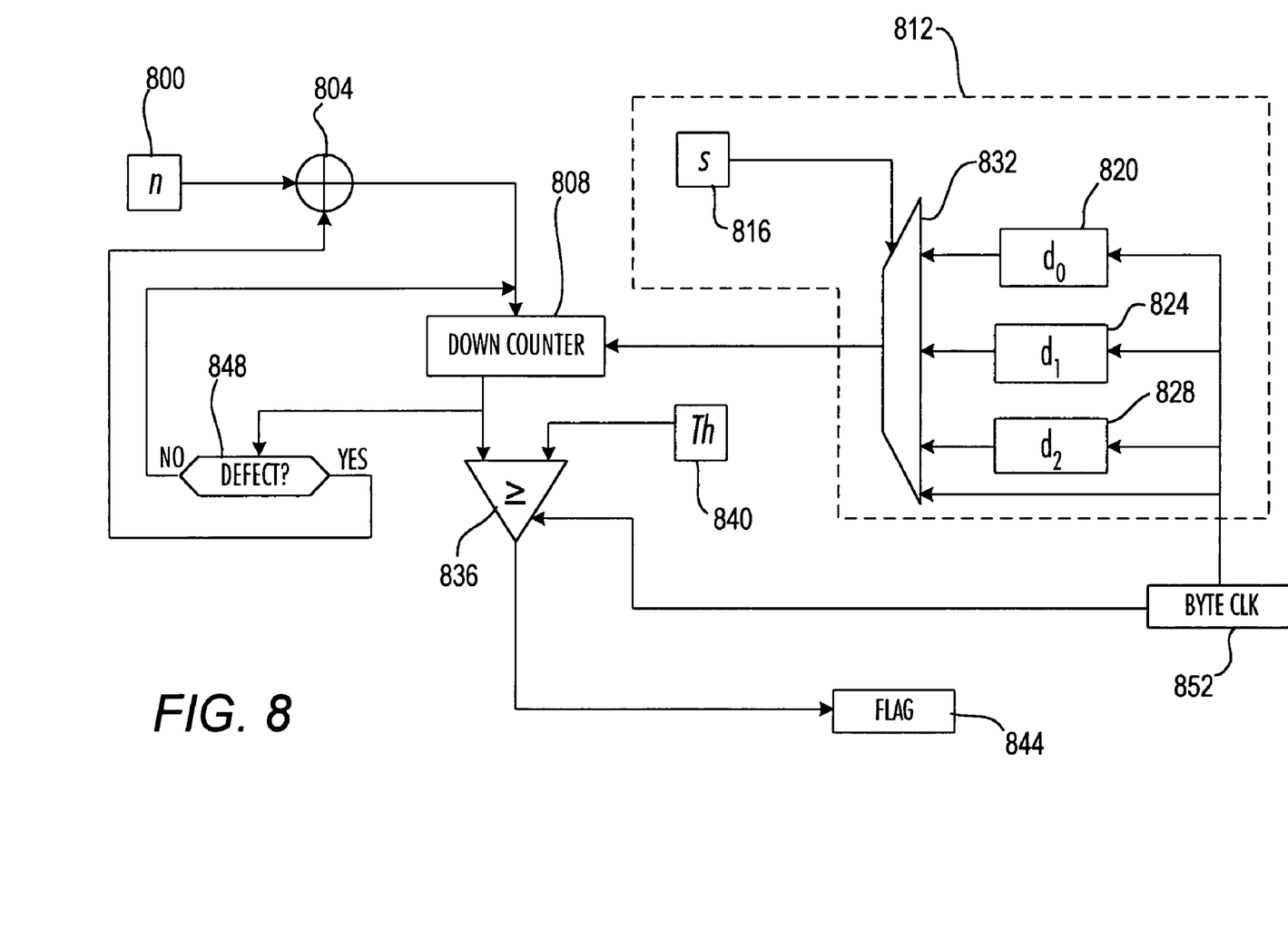
FIG. 8 is a diagrammatic representation of an embodiment of the present invention.

With reference now to FIG. 8, an implementation of an embodiment of the present invention is illustrated in block diagram form. A count increment n is provided by a memory or register block 800 to summing block 804. In general, the summing block 804 performs the function i=i+n. The value i output from the summing block 804 is provided to a down counter 808. The down counter 808 also receives a decay value $s_n$ from decay circuit 812. The decay circuit 812 generally includes a register 816 that stores a value s, a number of registers 820, 824 and 828 for storing values $d_2$, $d_1$ and $d_0$ respectively, generally referred to as the value $d_n$, and function block 832. In general, the function block 832 receives a rate of decay s from register 816, and selectively divides the value s by the value $d_n$ held by the registers 820, 824 or 828 ($s_n = s \div d_n$). Alternatively, the value s is divided by one. The value by which s is divided is determined by, for example, the count value i held by the down counter 808.

The down counter 808 receives the value $s_n$ from the function block 832 of the decay circuit 812, and decrements i by $s_n$ ($i=i-s_n$). The new value for i is output to a comparator 836, which receives at a second input a threshold value held by register 840. If the value i is greater than or equal to the threshold value, the comparator 836 generates a flag 844. The output of the down counter 808 is also provided to a decision block 848. The decision block 848 determines whether a byte under consideration contains a defect. If no defect is detected with respect to the byte, the count value i is decremented in the down counter 808 by the value $s_n$. If a defect is detected, the count value i is incremented by the value n at the summing block 804, and the new value for i is provided to the down counter 808.

The operation of the embodiment illustrated in FIG. 8 is generally timed to the output of a byte clock 852. The byte clock 852 outputs a signal timed to corresponding to the receipt of information concerning a next byte of storage space. Accordingly, a step of determining whether a byte contains a defect, and a step of decrementing the count value i, is performed for each byte of storage space on a track 136.

Figure 9:
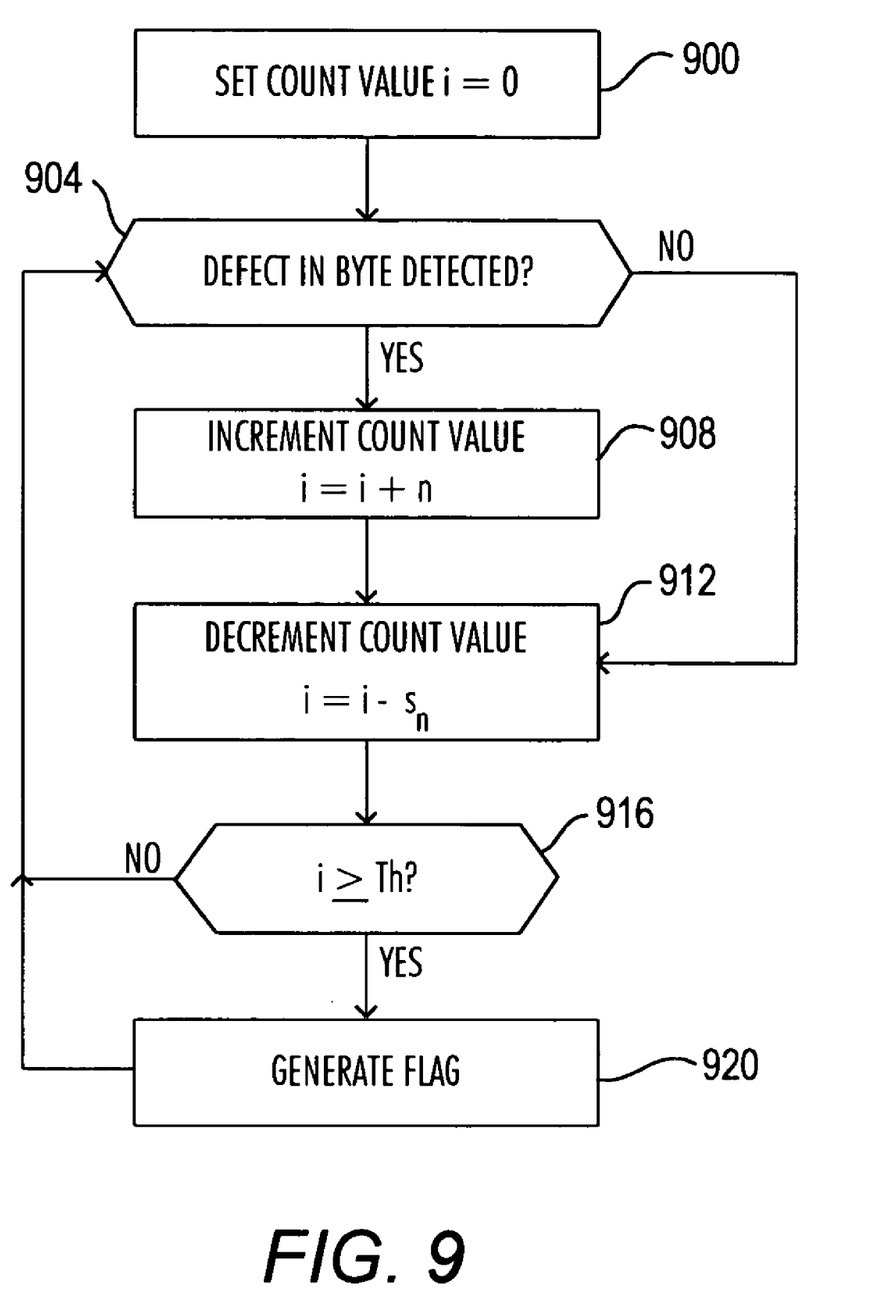
FIG. 9 is a flow chart illustrating operational aspects of the embodiment of the present invention illustrated in FIG. 8.

The operation of yet another embodiment of the present invention is generally shown in FIG. 9. In particular, FIG. 9 illustrates the operation of an embodiment implemented as illustrated in FIG. 8. Initially, at step 900, the count value i is set equal to zero. At step 904, a determination is made as to whether a defect in the byte under consideration is detected. If a defect is detected, the count value is incremented by n (i=i+n) (step 908). The count value i is then decremented by $s_n$ ($i=i-s_n$) (step 912).

The count value i is then compared to the threshold at step 916. If i is greater than or equal to the threshold, a defect flag is generated at step 920, and the system returns to step 904 to determine whether a next byte contains a defect. If i is not found to be greater than or equal to the threshold, the system returns directly to step 904.

From the above description, it can be appreciated that a determination is made as to whether a byte contains a defect, and whether a defect flag should be generated for each byte of storage space in a track 136.

In general, the present invention may be implemented in software or firmware associated with the disk drive 100. For example, the present invention may be implemented in firmware running on the controller 140. Alternatively, the present invention may be implemented on a host computer interconnected to the disk drive 100. The present invention may also be implemented using hardware included as part of the disk drive 100, or in a circuit that may be interconnected to the disk drive 100. Furthermore, although the above description has used magnetic drives as an example, the present invention is not so limited. For instance, the present invention may be applied in connection with optical, tape, or three dimensional storage devices.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for locating defective areas of a disk included as part of a hard disk drive, comprising:
   determining a number of detected defects per unit area of said disk;
   comparing said number of detected defects per unit area of said disk to a threshold amount;
   generating a flag if said number of defects per unit area of said disk is greater than said threshold amount;
   receiving a first indication that a portion of said disk contains a defect, wherein said step of determining a number of defects per unit area of said disk comprises, in response to receiving said first indication, incrementing a value i held by a counter by a value n, wherein said value i represents said number of detected defects per unit area of said disk, and wherein n is the amount by which i is incremented when said indication that a portion of said disk contains a defect is received; and
   decrementing said value i held by said counter by a first amount $s_1$, wherein said step of decrementing is completed prior to receiving a second indication that a portion of said disk contains a defect, and wherein $s_1$ is a rate of decay of said value i when said value i is greater than a first amount.

2. The method of claim 1, further comprising:
   receiving said second indication that a portion of said disk contains a defect, wherein said step of determining a number of defects per unit area of said disk further comprises, in response to receiving said second indication, incrementing said value i held by said counter by said value n, wherein said value i represents said number of detected defects per unit area of said disk.

3. The method of claim 2, further comprising decrementing said value i held by said counter by a second amount $s_2$, wherein said step of decrementing is completed prior to receiving a third indication that a portion of said disk contains a defect, and wherein $S_2$ is a rate of decay of said value i when said value i is greater than a second amount.

4. The method of claim 1, further comprising, in response to generating a flag, sparing at least a first portion of said disk.

5. The method of claim 1, wherein said number of detected defects per unit area of said disk is determined with respect to a length of a selected track located within a selected one or more writable sectors on said disk.

6. The method of claim 1, wherein information specifying a location of a detected defect is not stored.

7. A method for locating defective areas of a disk included as part of a hard disk drive, comprising:
   determining a number of detected defects per unit area of said disk;
   comparing said number of detected defects per unit area of said disk to a threshold amount;
   generating a flag if said number of defects per unit area of said disk is greater than said threshold amount; and
   receiving a first indication that a portion of said disk contains a defect, wherein said step of determining a number of defects per unit area of said disk comprises:
   in response to receiving said first indication, incrementing a value i held by a counter by a value n; and decrementing said value i held by said counter by a value $s_1$, wherein said value i represents said number of detected defects per unit area of said disk, and wherein $s_1$ is a rate of decay of said value i when said value i is greater than a first amount.

8. The method of claim 7, wherein said step of decrementing by said value $s_1$ is performed after said step of comparing.

9. The method of claim 7, further comprising:
receiving a second indication that a portion of said disk contains a defect; and
a second step of determining a number of defects per unit area of said disk, wherein said second step of determining a number of defects per unit area of said disk comprises, in response to receiving said second indication, incrementing said value i held by said counter by said value n.

10. The method of claim 9, further comprising decrementing said value i by a value $S_2$, wherein $S_2$ is a rate of decay of said value i when said value i is greater than a second amount.

11. The method of claim 10, wherein said step of decrementing by said value $S_2$ is performed after a second step of comparing.

12. The method of claim 7, wherein said number of detected defects per unit area of said disk is determined with respect to a length of a selected track located within a selected one or more writable sectors on said disk.

13. The method of claim 7, further comprising, in response to generating a flag, sparing at least a first portion of said disk.

14. A method for identifying defective areas of a disk in a computer hard disk drive, comprising:
selecting a defect density error threshold;
assigning a value n to a defect;
in response to receiving a signal indicating that a defect has been detected, adding said value n to a counter value i, wherein n is the amount by which i is incremented after a defect is detected, and wherein i represents a density of detected defects;
decrementing said counter value i by an amount s for each selected portion of said disk in which a defect is not encountered, wherein s is a rate of decay of said value i; and
generating a defect density error flag if said counter value i is greater than said defect density error threshold.

15. The method of claim 14, wherein said value n is one, and wherein said amount s is less than or equal to one.

16. The method of claim 14, wherein said amount s is selected from a plurality of values, and wherein a one of said values selected depends on said counter value.

17. The method of claim 14, wherein said amount s is variable and depends on said counter value.

18. The method of claim 14, wherein said counter value is equal to zero if no defects have been detected.

19. The method of claim 14, wherein said defect density error threshold is equal to (D−1) n, where D is a selected number of defects.

20. The method of claim 14, further comprising, in response to said generated defect density error flag, sparing a selected portion of said disk, wherein said selected portion of said disk corresponds to a length of a track on said disk required to store a byte of user data.

21. An apparatus for detecting defective areas of a disk included as part of a hard disk drive, comprising:
a summing block;
an input for receiving an indication of a defect, wherein a first value is provided to said summing block upon receipt of said indication of said defect;
a down counter, wherein said down counter decrements a first sum received from said summing block; and
a comparator, wherein a decremented sum received from said down counter is compared to a threshold value, and wherein a flag is generated if said value received from said down counter is not an acceptable value.

22. The apparatus of claim 21, wherein upon receipt of a second indication of a defect said first value is added to a decremented sum provided by said down counter to produce a second sum.

23. The apparatus of claim 21, wherein an amount by which said down counter decrements a sum received from said summing block is varied according to a value of said decremented sum.

24. A method for locating defective areas of a disk included as part of a hard disk drive, comprising:
determining a number of detected defects per unit area of said disk;
comparing said number of detected defects per unit area of said disk to a threshold amount; and
generating a flag if said number of defects per unit area of said disk is greater than said threshold amount,
wherein said number of detected defects per unit area of said disk is determined with respect to a length of a selected track located within a selected one or more writable sectors on said disk.

25. The method of claim 24, wherein said step of determining a number of defects per unit area of said disk comprises calculating a sum of defects occurring within a selected portion of said disk.

26. The method of claim 24, further comprising receiving a first indication that a portion of said disk contains a defect, wherein said step of determining a number of defects per unit area of said disk comprises, in response to receiving said first indication, incrementing a value i held by a counter by the value n, wherein said value i represents said number of detected defects per unit area of said disk, and wherein n is the amount by which i is incremented when said indication that a portion of said disk contains a defect is received.

27. The method of claim 26, further comprising decrementing said value i held by said counter by a first amount $s_1$, wherein said step of decrementing is completed prior to receiving a second indication that a portion of said disk contains a defect, and wherein $s_1$ is a rate of decay of said value i when said value i is greater than a first amount.

28. The method of claim 27, further comprising:
receiving said second indication that a portion of said disk contains a defect, wherein said step of determining a number of defects per unit area of said disk further comprises in response to receiving said second indication, incrementing said value i held by said counter by said value n, wherein said value i represents said number of detected defects per unit area of said disk.

29. The method of claim 28, further comprising decrementing said value i held by said counter by a second amount $s_2$, wherein said step of decrementing is completed prior to receiving a third indication that a portion of said disk contains a defect, and wherein $s_s$ is a rate of decay of said value i when said value i is greater than a second amount.

30. The method of claim 24, further comprising receiving a first indication that a portion of said disk contains a defect wherein said step of determining a number of defects per unit area of said disk comprises:

in response to receiving said first indication, incrementing a value i held by a counter by a value n; and decrementing said value i held by said counter by a value $s_1$, wherein said value i represents said number of detected defects per unit area of said disk, and wherein $s_1$ is a rate of decay of said value i when said value i is greater than a first amount.

31. The method of claim 30, wherein said step of decrementing by said value $s_1$ is performed after said step of comparing.

32. The method of claim 30, further comprising:

receiving a second indication that a portion of said disk contains a defect; and a second step of determining a number of defects per unit area of said disk, wherein said second step of determining a number of defects per unit area of said disk comprises, in response to receiving said second indication, incrementing said value i held by said counter by said value n.

33. The method of claim 32, further comprising decrementing said value i by a value $s_2$, wherein $s_2$ is a rate of decay of said value i when said value i is greater than a second amount.

34. The method of claim 33, wherein said step of decrementing by said value $s_2$ is performed after a second step of comparing.

35. The method of claim 24, further comprising, in response to generating a flag, sparing at least a first portion of said disk.

36. The method of claim 24, wherein information specifying a location of a detected defect is not stored.

37. A method comprising:

providing a disk drive having a disk;

generating a flag if a defect density in an area of said disk is greater than a selected amount, wherein said defect density is determined by:

incrementing a counter value if a defect is detected in a selected portion of said area of said disk, and decrementing the counter value if a defect is not detected in a selected portion of said area of said disk.

38. The method of claim 37, wherein the counter value is incremented by a first amount if a defect is detected, wherein the counter value is decremented by a second amount if a defect is not detected, and wherein the first amount is different from the second amount.

39. The method of claim 38, wherein the first amount is variable.

40. The method of claim 38, wherein the second amount is variable.

41. The method of claim 38, wherein both the first amount and the second amount are variable.

42. The method of claim 37, wherein the counter value is limited to a maximum value.

43. The method of claim 37, wherein the counter value is limited to a minimum value.

44. The method of claim 37, wherein the counter value is both limited to a maximum value.

45. The method of claim 37, further comprising, in response to generating a flag, sparing at least a first portion of said disk.

46. A hard disk comprising:

a disk; and circuitry for generating a flag if a defect density in an area of said disk is greater than a selected amount, wherein said defect density is determined by:

incrementing a counter value if a defect is detected in a selected portion of said area of said disk, and decrementing the counter value if a defect is not detected in a selected portion of said area of said disk.

47. The hard disk drive of claim 46, wherein the counter value is incremented by a first amount if a defect is detected, wherein the counter value is decremented by a second amount if a defect is not detected, and wherein the first amount is different from the second amount.

48. The hard disk drive of claim 47, wherein the first amount is variable.

49. The hard disk drive of claim 47, wherein the second amount is variable.

50. The hard disk drive of claim 47, wherein both the first amount and the second amount are variable.

51. The hard disk drive of claim 46, wherein the counter value is limited to a maximum value.

52. The hard disk drive of claim 46, wherein the counter value is limited to a minimum value.

53. The hard disk drive of claim 46, wherein the counter value is both limited to a maximum value and a minimum value.

* * * * *